United States Patent [19]

Eisemann

[11] 4,410,971
[45] Oct. 18, 1983

[54] FRONT LOADING RECORD PLAYER

[75] Inventor: Kurt Eisemann, Berlin, Fed. Rep. of Germany

[73] Assignee: U.S. Philips Corporation, New York, N.Y.

[21] Appl. No.: 255,926

[22] Filed: Apr. 20, 1981

[30] Foreign Application Priority Data

May 24, 1980 [DE] Fed. Rep. of Germany ....... 3019928

[51] Int. Cl.$^3$ .......................... G11B 1/00; G11B 25/04
[52] U.S. Cl. ......................................... 369/75; 369/77; 369/265; 369/266
[58] Field of Search .................. 369/77, 265, 191, 75, 369/264, 266, 258; 360/86, 97, 133

[56] References Cited

U.S. PATENT DOCUMENTS

| 2,508,845 | 5/1950 | Thompson | 369/77 |
| 3,870,321 | 3/1975 | Smith et al. | 369/271 |
| 4,272,794 | 6/1981 | Skarky | 360/133 |
| 4,337,533 | 6/1982 | Ando et al. | 369/271 |
| 4,347,596 | 8/1982 | Abe et al. | 369/265 |

Primary Examiner—Steven L. Stephan
Attorney, Agent, or Firm—Joseph P. Abate

[57] ABSTRACT

A reproducing apparatus for information-carrying records, which apparatus comprises:
  a housing with an opening for inserting such records, which opening is situated at housing front,
  a drive mechanism for the rotary drive of the records about an axis of rotation, which mechanism is accommodated in the housing,
  a turntable for supporting the records, which turntable is axially movable between a lowered position and an operating position, and
  a lifting device for moving the turntable between the lowered position and the operating position,
in which apparatus
  there is provided a support (14), which supports the turntable (13) in the lowered position,
  the turntable (13) can be lifted off the support (14) into the operating position by means of the lifting device (35, 45, 47, 49, 51), and
  there is provided a positioning device (11) for moving the support (14) and the turntable (13) carried by said support between the lowered position of the turntable and a position in which it extends at least partly from the housing (3).

4 Claims, 7 Drawing Figures

FRONT LOADING RECORD PLAYER

BACKGROUND OF THE INVENTION

The invention relates to a reproducing apparatus for records provided with information, which apparatus comprises
- a housing with an opening for inserting such records, which opening is situated at the housing front,
- a drive mechanism for the rotary drive of the records about an axis of rotation, which mechanism is accommodated in the housing,
- a turntable for supporting the records, which is axially movable between a lowered position and an operating position, and
- a lifting device for moving the turntable between the lowered position and the operating position.

From U.S. Pat. No. 2,094,246 it is known to mount a record player as a unit in a drawer which can be pulled out of a cabinet or housing. However, this has several disadvantages. First of all, the drawer guide system should be very stable, because it should be capable of supporting the entire apparatus, which is located outside the housing when the drawer is pulled out. A further disadvantage is the unfavourable load distribution at the front of the housing when the record player is pulled out. Finally, pulling out the record player also has technical disadvantages if upon starting the record player is slid into the apparatus with a rotating record. Due to the resilient suspension the acceleration and deceleration during slidingin give rise to oscillations, which may readily lead to an undesired displacement of the pick-up arm or to the stylus slipping out of the groove.

Moreover, it is known from JP-OS No. 53-49815 to insert a gramophone record into the housing through a horizontal slot in the housing. Inside the housing the record is gripped by a gripping mechanism and is brought into its playing position relative to the housing and the turntable. Subsequently, the turntable is raised and takes over the record from the gripping device.

SUMMARY OF THE INVENTION

It is the object of the invention to provide a reproducing apparatus of the type mentioned in the opening paragraph, which ensures a gentle treatment of the record and allows the use of a plurality of speeds and different record diameters, the gramophone record being put on outside the housing.

According to the invention said problem is solved in a reproducing apparatus of the type mentioned in the opening paragraph in that
- there is provided a support, which supports the turntable in the lowered position,
- the turntable can be lifted off the support into the operating position by means of the lifting device, and
- there is provided a positioning device for moving the support and the turntable carried by said support between the lowered position of the turntable and a position in which it is situated at least partly outside the housing.

By means of the extensible and retractable support the record, in the same way as in a conventional record player, can carefully be placed onto or removed from the turntable externally of the housing. The playing process itself is effected automatically after the record has been inserted into the housing. Since the entire playing mechanism is accommodated inside the housing, the positioning device can be of a light construction. Moreover, a special gripping and centring device may be dispensed with. The record remains on the turntable from the instant that it is manually placed onto the turntable until it is again manually removed.

A further embodiment of the invention is characterized in that
- the drive mechanism comprises a coupling device which is rotatable about the axis of rotation,
- the coupling device is axially movable by the lifting device from an initial position, which is situated below the lowered position of the turntable, via an intermediate position, in which the coupling device is made to engage with the turntable in order to position the turntable, into a drive position, which corresponds to the operating position of the turntable, and back.

Setting the record player to the playing mode once a record is placed in position is then effected solely by lifting and lowering the coupling device.

In a further embodiment of the invention the coupling device comprises a drive platten. In the operating position the drive platten and the turntable together constitute the customary, integral turntable. In order to ensure the cooperation of the drive platten and the turntable of the novel construction, the drive platen and the turntable are provided with cooperating centring members, which once coupling is established, centre the turntable relative to the axis of rotation. When the turntable has been lifted by the drive platen the two elements are rotationally coupled to each other.

In accordance with a further embodiment of the invention the positioning device comprises a slide on which the support is arranged and which loosely carries the turntable in the initial position of the coupling device. The slide comprises a plurality of slide sections. This results in a telescopically extensible construction with an overall side length which, if the construction for example comprises two parts, is not longer than the diameter of a 30-cm gramophone record.

In a further embodiment of the invention the reproducing apparatus is so constructed that
- the turntable is provided with a centring pin for records that are put on the turntable,
- there is provided a shaft for carrying the coupling device,
- the shaft is journalled in a bearing bush with a closed bottom, which axially supports the shaft,
- the bearing bush is axially movable by means of lifting device for moving the coupling device between the initial position and the operating position,
- there is provided a latching device, which prevents the bearing bush from being rotated relative to the housing.

For lifting and lowering the coupling device and the turntable and thus for moving the turntable into the operating and the initial position, the bearing bush is simply raised or lowered, which can be realized by means of a technically simple lifting and lowering device.

A further embodiment of the invention is characterized in that
- the support is provided with at least one signal switch
- the signal switch provides a signal to a switching mechanism to indicate whether or not a record is present on the turntable.

The signal switch is then provided with a switching pin, which is depressible by a record that is put on the turntable.

Finally, in accordance with a further embodiment of the invention, the switching mechanism is connected to a logic circuit, which ensures that the slide with the support remains in the extended position if the record is not removed, and which ensures that the slide is automatically retracted, namely after 25 secs when the record is removed or after 5 secs when the record is changed.

The reproducing apparatus is suitable both for stylus-scanned and for optically or capacitively scanned records. This construction is particularly suitable for use in stacks, closed racks, etc. because only the front should be accessible for loading and operation.

BRIEF DESCRIPTION OF THE DRAWING

The invention will be described in more detail with reference to the drawings, which show an embodiment. In the drawings.

DESCRIPTION OF THE PREFERRED EMBODIMENTS

Figure 1:
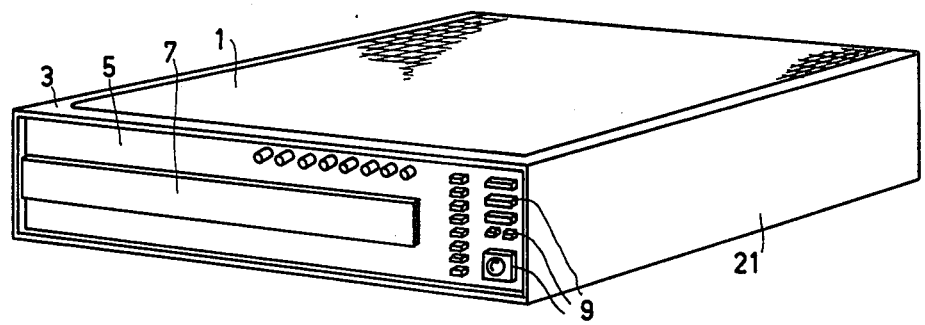
FIG. 1 shows the reproducing apparatus in the rest or playing position.

FIG. 1 shows the reproducing apparatus in accordance with the invention in the rest or playing position. In this position the housing 3 is fully closed. At the front 5 of the housing there are arranged only a loading flap 7 and various controls 9, for example for a selector indication as well as local and remote control.

Figure 2:
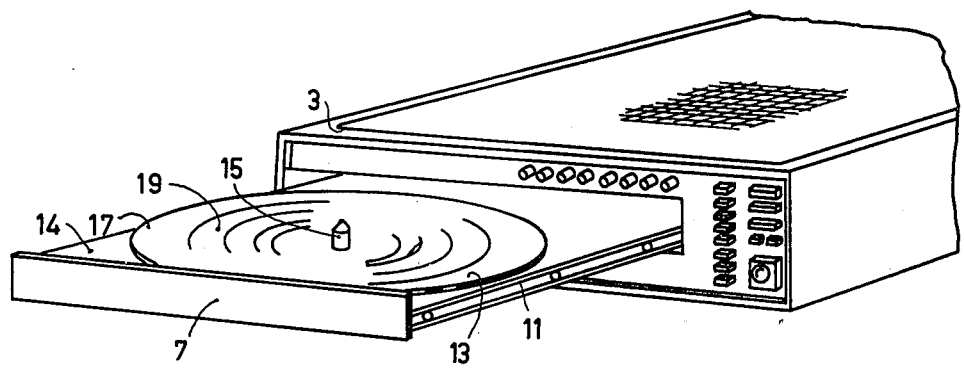
FIG. 2 shows the reproducing apparatus shown in FIG. 1 in the loading position with the slide extended.

In FIG. 2, a slide 11, which serves as a positioning device, is withdrawn from the housing 3, which slide moves the loading flap 7 forwards. The slide 11, together with a support 14 which it carries, is extended so far that the turntable 13 which rests on the support 14 is freely accessible. The turntable 13 also comprises a centring pin 15, which serves for centring a record placed on the turntable, which record is provided with information which can be scanned by means of a stylus, light rays or capacitively. In the extended position shown in FIG. 2 the turntable 13 is supported only at its rim 17 by the support 14. Its central position 19 extends freely over a large opening 20.

Figure 3:
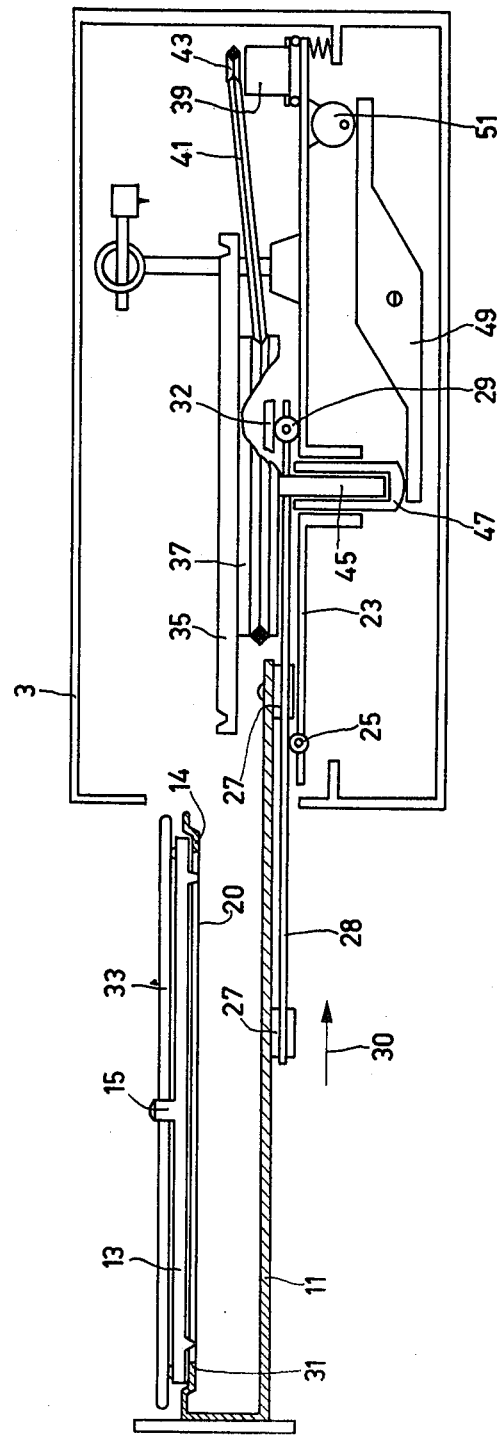
FIG. 3 is a side view of the reproducing apparatus with the slide extended and a side wall removed.

FIG. 3 shows the apparatus as illustrated in FIG. 2 in side view, the side wall 21 being removed. The support 14 is movable with the slide 11 and the slide 11 is movable on the chassis plate 23. For this purpose the chassis plate 23 is provided with rollers 25 and the slide with rollers 27. Between the chassis plate 23 and the slide there is provided an intermediate slide 28 with rollers 29, which intermediate slide cannot be tilted upwards owing to the provision of a rail 32. This construction permits a telescopic movement of the two-part slide 11, 28. As can be seen in FIG. 3, the two-part slide is retractable into the housing 3 in the direction of the arrow 30.

The turntable with the centring pin 15 is supported by the rim 31 of the support 14. On the turntable an information-carrying record 33 is placed.

Figure 5:
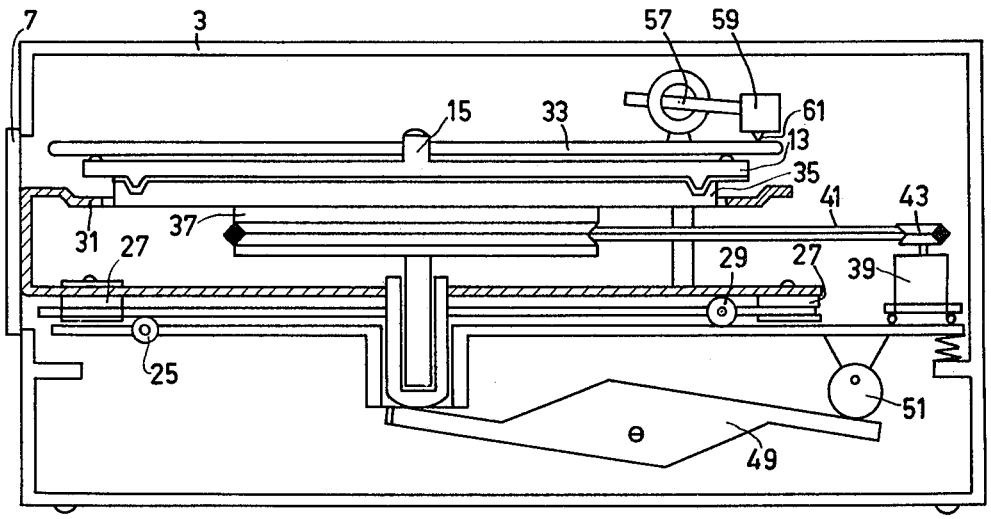
FIG. 5 is a side view of the reproducing apparatus with the slide retracted and drive platen lifted in the playing mode.
Figure 6:
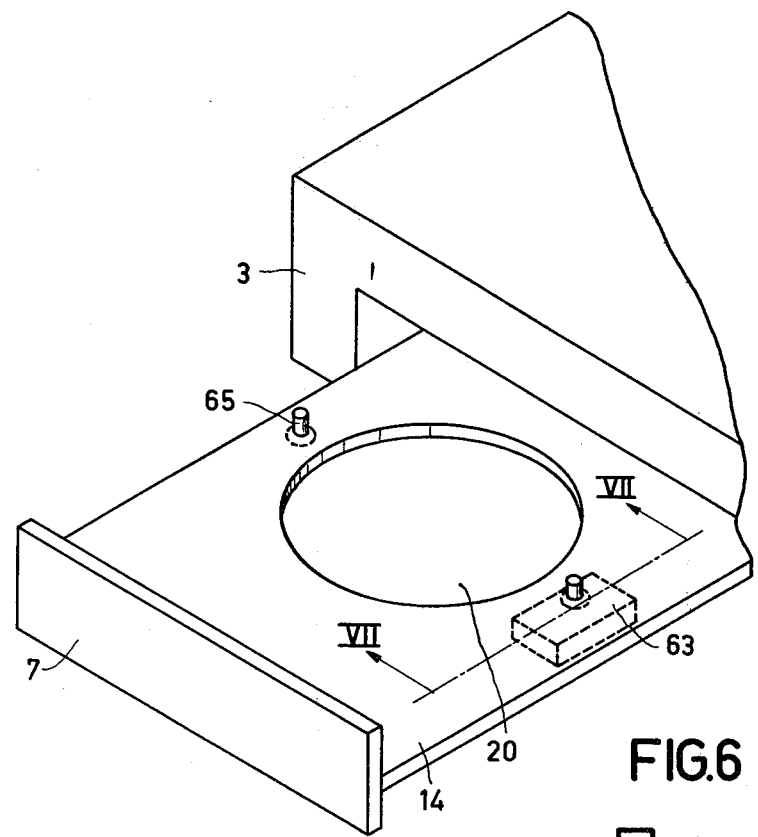
FIG. 6 shows the extended support of the reproducing apparatus with signal switches for function control.
Figure 7:
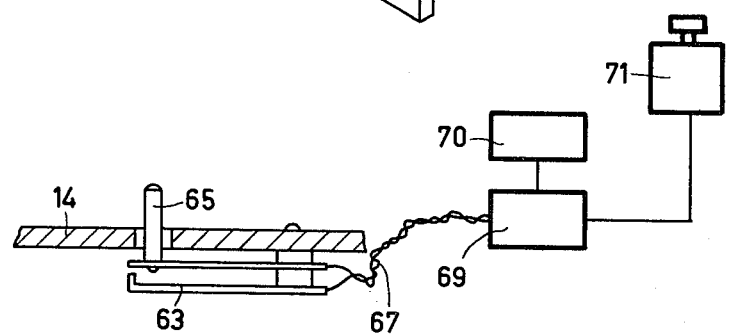
FIG. 7 is a functional block diagram for the signal switches.

Inside the housing 3 there is arranged a drive platten 35, which belongs to a coupling device and which is rigidly connected to a pulley 37. Driving is effected by a drive motor 39 via a belt drive 41. In the position of FIG. 3 the belt drive 41 is slightly inclined, but this is of no significance because the turntable is stationary in the position of FIG. 3. Rotation is not imparted to the drive platen 35 via the belt drive 41 until said platten is in the lifted position. In the lifted position the pulley 37 and the drive pulley 43 are situated with their grooves in one plane (FIG. 5).

Via a shaft 45 the drive platen is journalled in a bearing bush 47, the shaft bearing on the bottom 48 of the bush. The bearing bush 47 can be lifted by means of a lever 49. Lifting is effected by means of, for example, a cam 51, which can act on the two-arm lever 49. However, it is alternatively possible to effect lifting and lowering by means of a control disc.

Figure 4:
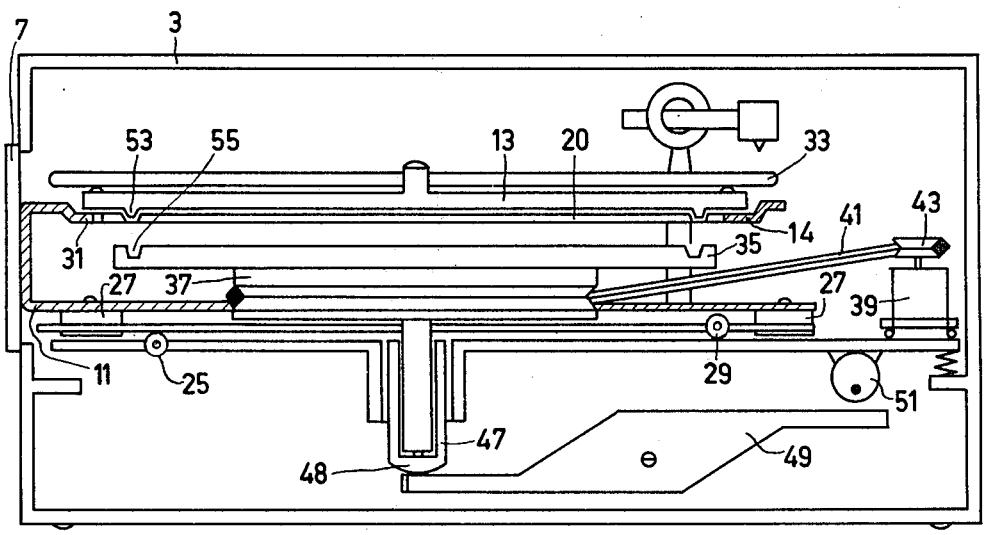
FIG. 4 is a side view of the reproducing apparatus with the slide retracted and a side wall removed.

In FIG. 4 the slide 11 with the support 14 carried by it is retracted into the housing 3, and the turntable 13 is situated in a lowered position above the drive platen 35. In this lowered position of the turntable no playing cycle takes place. The drive platen 35 is situated in an even lower position in its initial position. The cam 51 lifts the drive platen 35 via the two-arm lever 49 and the bush 47 (FIG. 5) into the lowered position, in which the drive platen 35 engages with the underside of the turntable 13. The drive platen 15 is further raised, lifts the turntable 13 with the record 33 of the rim 31 of the support 14 and moves it into the operating position. In the operating position the pulley 37 and the drive pulley 43 are situated at the same level, so that the belt drive 41 is no longer inclined.

In the lowered position the drive platen 35 and the turntable 13 are rotationally coupled and form-coupled to each other via a coupling device. This coupling device comprises projections 53 on the underside of the turntable 13 and recesses 55 in the upper side of the drive platen 35, which projections and recesses engage with each other.

Thus, the reproducing apparatus is ready for playing and the control mechanism (for playing) can be started. This means that the drive motor 39 now drives the turntable 13 via the belt drive 41 and the drive platen 35. The pick-up head 59 arranged on the pick-up arm 57 is subsequently positioned with its stylus 61 on the record in order to play said record. When the playing process has been completed, the pick-up arm is automatically lifted and is returned to its rest position and the cam lowers the drive platen 35 and with it the turntable 13 so far that the turntable 13 is disengaged from the platen in the lowered position and again rests on the support 14. The drive platen moves further downwards into its initial position. The slide 11 is extended, so that the record can be changed at a loading position located outside the housing 3.

On the underside of the support 14 there are arranged two signal switches 63, from which switching pins 65 project upwards through the support 14. The switching pins 65 project so far from the upper side of the support 14 that they are depressible by a gramophone record placed on the turntable. Via a connecting lead 67 control signals from the signal switches 63 can be transmitted to a switching mechanism 69, which is associated with a logic circuit 70. The signals, which are processed in the switching mechanism, then ensure that a motor 71 (shown schematically in FIG. 1), in conformity with the signal from the switching pins 65, provides the correct movement for the support 14, i.e. for extension or retraction. The signal switches 63 are operative only when the support 14 is in the extended position. In the retracted position the signal switches are disconnected from the switching mechanism 69, so that no signal is produced when the turntable 13 is lowered.

The automatic control via the switching mechanism 69 is effected as follows: When, upon termination of a playing process, the slide 11 with the support 14 is extended, it remains extended until the record is removed from the turntable. If the record is not removed, the slide remains outside the apparatus for an unlimited time. When the record is removed, the slide is retracted after, for example, 25 secs if another record is not put on. However, if another record is put on, the slide is retracted 5 secs. after putting on the record and a new playing process is started.

What is claimed is:

1. A front loading type record player, comprising:
   a housing;
   means, accommodated within said housing, for driving a record about an axis of rotation;
   a turntable, associated with said housing, for supporting a record placed thereon, said turntable being movable in a direction substantially transverse of said axis, between a loading position located outside of said housing and a lowered position located inside of said housing;
   means, slidably provided on said housing, for supporting said turntable for movement between said loading and said lowered positions;
   means, associated with said housing, for moving said turntable between said lowered position and an operating position at which said turntable is rotated by said driving means;
   characterized in that said driving means and said moving means include a coupling device rotatable about said axis of rotation and movable axially along said rotation axis from an initial position situated below said lowered position, through an intermediate position at which said device engages with said turntable, whereby said device and said turntable are movable axially along said axis, to a drive position at which said turntable is located at said operating position.

2. A record player as claimed in claim 1, wherein said coupling device comprises a drive platen.

3. A record player as claimed in claim 1, wherein said turntable includes a centering pin coaxial with said axis of rotation, said driving means and said moving means include a shaft and a bearing which supports said shaft, said shaft carrying said coupling device, and said bearing having a closed bottom.

4. A record player as claimed in claim 3, wherein said supporting means is provided with means for indicating the presence of a record placed on said turntable.

* * * * *